April 11, 1939.  C. H. SCHURR  2,154,055
METHOD OF MAKING POWER TRANSMITTING MEANS
Original Filed April 12, 1935
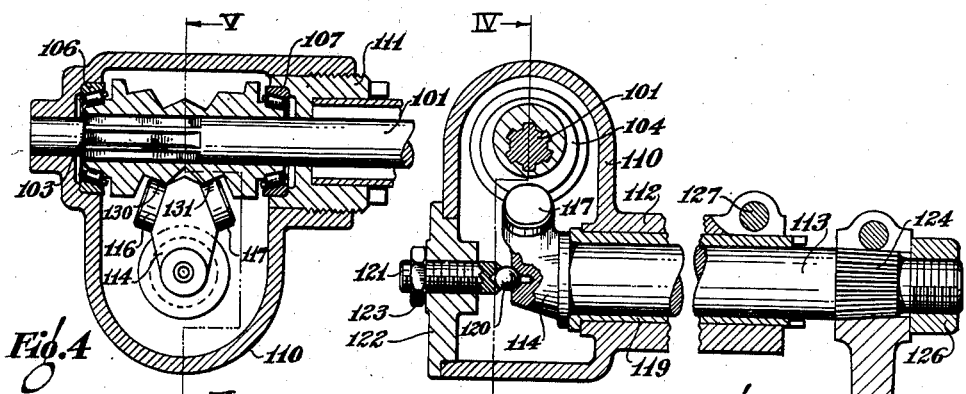
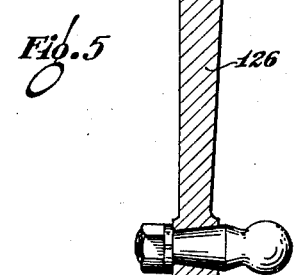
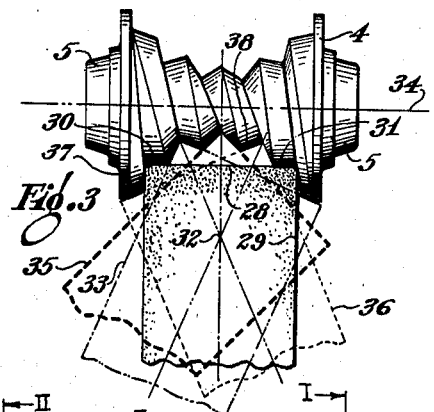
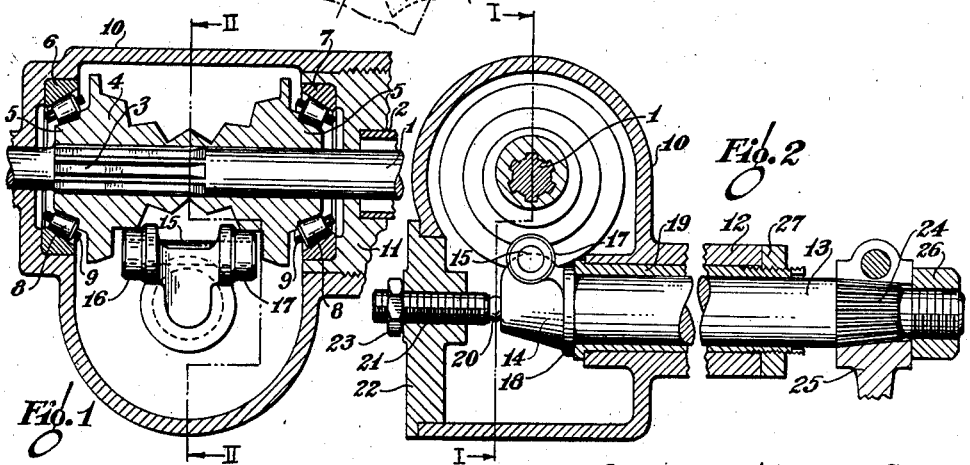
Inventor
Charles H. Schurr
by Hawgood and Van Horn
Attorneys

UNITED STATES PATENT OFFICE 2,154,055

METHOD OF MAKING POWER TRANSMITTING MEANS

Charles H. Schurr, Cleveland, Ohio, assignor to The Lees-Bradner Company, Cleveland, Ohio, a corporation of Ohio Original application April 12, 1935, Serial No. 16,054. Divided and this application July 15, 1936, Serial No. 90,746

5 Claims. (Cl. 51—278)

This invention relates to method of making power transmitting means, and is particularly adapted to the transmission of power from one shaft which may rotate through more than one revolution to another which rotates less than a revolution such, for instance, as the steering and rock shafts, respectively, found in the steering gear mechanism of automotive vehicles.

An object of the invention is to provide an improved method of producing a power transmitting element or mechanism.

Another object is to provide an improved method of producing a power transmitting element which may easily be performed.

Another object is to provide an improved method of producing a power transmitting element which will produce articles of great accuracy.

Another object is to provide an improved method of producing a power transmitting element which will produce articles by a generative action.

Other objects will hereinafter appear.

The invention will be better understood from the description of two practical types of apparatus and of the manner of producing them, which includes methods embodying the invention, the apparatus being illustrated in the accompanying drawing, in which:

Figure 1 is a sectional view of one form of steering gear produced by a process embodying the invention, taken on the axis of the driving member;

Figure 2 is a sectional view of the apparatus of Figure 1 taken on the line II—II thereof;

Figure 3 is a fragmentary view showing the production of the driving member of Figures 1 and 2, and diagrammatically indicates parts of the mechanism used in producing the same;

Figure 4 is a view similar to Figure 1 showing another form of steering gear produced by a process constituting an embodiment of the invention; and Figure 5 is a view taken on the line V—V of Figure 4 and similar to Figure 2.

Referring first to the apparatus of Figures 1 to 3, the steering gear consists of a steering column or driving shaft 1, enclosed in a tubular casing or steering column proper 2, and having a splined end 3 carrying a driving member 4. The drive member 4 is of generally spool-shaped configuration, and is provided with helico-spiral driving surfaces which bear some general resemblance both to a thread and to the convolutions of a worm gear, but, as will be hereinafter pointed out, differ in certain respects from either or both these articles.

This application is a division of my co-pending application, Serial Number 16,054, filed April 12, 1935, entitled Power transmitting means.

While in its action the drive member partakes of the nature of both a worm and a cam, it will be referred to, for convenience, as a drive gear.

The shaft 1 is supported, through drive member 4, in bearings shown as of the roller type. The inner races 5 of these bearings are made integrally with the driving member or gear 4, while the outer races 6 and 7 are supported by a housing which surrounds the outer transmitting mechanism, and the rollers 8 are retained in cages 9 between the races.

The housing consists of a hollow shell 10 into which is threaded a plug 11 through which the drive shaft passes and which supports the outer race 7 of the upper bearing. The plug provides both space for the insertion of the bearings and driving gear and means for adjusting the distance between the outer races of the bearings to compensate for wear, as by turning it, to cause its threads to move axially in or out of the hollow shell, race 7 may be moved into any desired position. The plug may be held in fixed position by any desired means, such as a set screw or lock nut.

Journalled within the shell in a bearing passing through a cylindrical extension 12 thereof is the rock shaft or driven member which is shown as consisting of a cylindrical shank 13 provided on its inner end with a head 14 bored for the reception of a pivot pin 15 on which are mounted two rollers 16 and 17 engaging the surfaces of the driving gear.

The shank has a shoulder 18 bearing upon the end of a sleeve or bearing 19 and the shoulder is held in engagement therewith by a single ball bearing 20 pressed against a depression in the end of the head by a set screw 21 threaded through a cover plate 22 forming a part of the shell and locked in position by a lock nut 23.

The outer end of the shank 13 is splined at 24 for the reception of an arm 25 which may be connected to the drag link which is fastened to steering arms customarily carried by the stub axles on which the wheels of the vehicles are mounted.

The arm upon the rock shaft is secured thereto by a nut 26 threaded onto the end of the shaft.

The bearing 19 is shown as provided with an eccentric bore, so that rotation of the bearing will move the rock shaft toward or from the drive shaft to provide an adjustment for compensating for wear, and may be retained in adjusted position in any desired manner, shown in Figures 1 and 2 as a lock nut 27.

The driving gear is provided with two helico-spiral cam surfaces both of which may be generated by the same straight line. The manner of their formation may be most clearly apparent from Figure 3, in which the cutting edge 28 of a tool is shown as one of the elements in the periphery of a cylindrical grinding wheel 29 with the axis of the grinding wheel arranged parallel to that of the drive gear. This wheel contacts surfaces 30 and 31 of the driving gear.

If, now, the wheel, while being driven, be rotated about an axis 32, corresponding to the axis of the rock shaft, and at the same time the driving gear be rotated about its own axis, it will be apparent that as the wheel moves from the position indicated at 29 to that indicated at 33 the left hand edge of the cutting surface moves toward the axis 34 of the driving member and to the right, while the right hand edge moves away from this axis and also to the right, these surfaces each tracing a convolution which progresses both radially and axially along the driving member. If the motions of both the grinding wheel and driving member be continued from the position shown at 33 to that shown at 35, these surfaces are prolonged to constitute another convolution.

If, now, the rotation of both grinding wheel and driving member be reversed, these parts first retrace their path through the positions above referred to and thence proceed to a position 36 in which the left hand edge of the wheel contacts surface 37 and the right hand edge contacts with surface 38.

It will be apparent that the two surfaces generated meet each other at some points at right angles, and at others at relatively obtuse angles, so that a tool having a rectangular cutting portion may be conveniently employed in forming them.

As the two rollers have their exterior surfaces lying in the same cylindrical surface, these also include a line which will contact one of the cam surfaces on one side and the other cam surface at the other, at the points which were formed at the same instant by the same elemental line of the grinding wheel.

Obviously, while a grinding wheel has been disclosed, it will be apparent that a straight-edged turning tool, a milling cutter having a cylindrical contour, or other cutter, either possessing or capable of generating a straight line, might be used.

As in the steering of a vehicle, the vehicle remains on a straight course for by far the greater portion of the time, the rollers will contact the parts of the driving gear at or near surfaces 30 and 31 most of the time, and wear will naturally be greater at these points than at the ends or center of gear 4.

It is therefore desirable that the rollers fit more tightly at points 30 and 31 than elsewhere. This result may be obtained by using a grinding wheel or the like of greater diameter than the rollers, as the surfaces of the part 4, being eccentric or spiral in shape, will contact the surface of the cutting tool outside the plane defined by the gear and tool axes. Also this result may be conveniently obtained or increased by rotating the tool about center slightly more remote from the axis of the drive gear 4 than that which will be assumed by the rock shaft.

In the apparatus shown in the first three figures, it is obvious that the driving shaft may make something over two revolutions, while the rock shaft is moved through considerably less than one revolution, it being impracticable to move the rock shaft beyond the point where both rollers are in engagement with the driving gear.

In Figures 4 and 5, the driving gear is formed in the same manner as that shown in the first three figures, it having however two less convolutions of the cam surfaces and thereby being reduced both in diameter and in length.

The rock shaft in this instance is provided with a head 114 having two integrally formed trunnions 116 and 117 or bearing surfaces which engage the cam surfaces of the driving gear at points 130 and 131 corresponding to 30 and 31 on the driving gear of the first three figures, so that the same amount of travel of the rock shaft and head is provided with the same number of rotations of the drive shaft as was the case in the first illustrated embodiment.

The production of the driving member in the last two figures may be much more expeditiously performed for two reasons, one; that two less revolutions of the drive member must be made in producing the same, and, two; that all surfaces may be completely formed by a single tool without its fouling the edges of the outer convolutions.

The adjustment shown in Figures 4 and 5 are the same as those of Figures 1 and 2, excepting that a clamping bolt 127 has been provided to lock the bearing in position. Corresponding parts, not specifically described in connection with these two figures, are provided with reference numerals corresponding to those of the first three figures, but increased by 100.

While I have described the methods which embody my invention in some particularity, obviously many others will readily occur to those skilled in this art, and I therefore do not limit myself to the precise details shown and described herein, but claim as my invention all embodiments, modifications and variations coming within the scope of the appended claims.

I claim:

1. The method of generating surfaces which comprises rotating a forming tool having a cylindrical working surface about its axis, oscillating the tool about a second axis lying in a plane normal to the first mentioned axis, simultaneously rotating a work blank being operated on by the tool about the axis of the blank, the rotation of the work blank and the oscillation of the tool being in predetermined timed relation, and thus causing the cylindrical surface of the tool at one side of said plane to generate one helico-spiral surface and the cylindrical surface of the tool on the other side of said plane to generate a second helico-spiral surface, said helico-spiral surfaces intersecting each other.

2. The method of generating surfaces which comprises rotating a forming tool whose working surface is a locus of a plurality of straight lines revolved about a non-perpendicular axis, oscillating the tool about a second axis lying in a plane normal to the first mentioned axis relative a work blank simultaneously rotating the work blank about its axis, the rotation of the work blank and the oscillation of the tool being in predetermined timed relation, and thus causing the tool at one side to generate one helico-spiral surface, on the other side to generate a second helico-spiral surface, said helico-spiral surfaces intersecting each other.

3. The method of generating surfaces which comprises arranging a tool having a cutting surface defining a straight line lying in a plane including the axis of a piece of work, relatively oscillating the tool and work about an axis normal to the said plane and remote from both the axis of the work and from said straight line, simultaneously rotating the work about its axis, correlating the oscillation of the tool and the rotation of the work at predetermined relative velocities, and causing the tool to form two intersecting helico-spiral surfaces upon the work.

4. The method of generating surfaces which comprises arranging a tool having a cutting surface defining a straight line lying in a plane including the axis of a piece of work, relatively oscillating the tool and work about an axis normal to the said plane and remote from both the axis of the work and from said straight line, simultaneously rotating the work about its axis, the working surfaces of the tool defining said line and extending to both sides of the intersection of said line with a perpendicular thereto from the axis about which the tool is oscillated, correlating the oscillation of the tool and the rotation of the work at predetermined relative velocities, and causing the tool at opposite sides of the said perpendicular to form two intersecting helico-spiral surfaces upon the work.

5. The method of generating surfaces which comprises arranging a grinding wheel having a cylindrical peripheral working surface defining a straight line lying in a plane including the axis of a piece of work, relatively oscillating the grinding wheel and work about an axis normal to the said plane and remote from both the axis of the work and from said straight line, simultaneously rotating the work about its axis, the working surfaces of the tool defining said line and extending to both sides of the intersection of said line with a perpendicular thereto from the axis about which the tool is oscillated, correlating the oscillation of the grinding wheel and the rotation of the work at predetermined relative velocities, and causing the grinding wheel at opposite sides of the said perpendicular to form two intersecting helico-spiral surfaces upon the work.

CHARLES H. SCHURR.